United States Patent [19]

Massey

[11] Patent Number: 4,516,328

[45] Date of Patent: May 14, 1985

[54] SHAFT ALIGNMENT DEVICE

[76] Inventor: Charles R. Massey, 3523 Southbrook, LaPorte, Tex. 77571

[21] Appl. No.: 508,268

[22] Filed: Jun. 27, 1983

[51] Int. Cl.$^3$ ............................................. G01B 5/25
[52] U.S. Cl. ................................... 33/181 R; 33/412
[58] Field of Search ............. 33/174 Q, 180 R, 181 R, 33/412

[56] References Cited

U.S. PATENT DOCUMENTS

| | | | |
|---|---|---|---|
| 2,638,676 | 5/1953 | Callahan | 33/180 R |
| 2,656,607 | 10/1953 | Harding | 33/180 R |
| 3,664,029 | 5/1972 | Glucoft et al. | 33/180 R |
| 4,161,068 | 7/1979 | McMaster | 33/412 |
| 4,367,594 | 1/1983 | Murray, Jr. | 33/412 |
| 4,413,415 | 11/1983 | Stovall | 33/181 R |

FOREIGN PATENT DOCUMENTS

| | | | |
|---|---|---|---|
| 972407 | 1/1951 | France | 33/181 R |
| 771458 | 10/1980 | U.S.S.R. | 33/181 R |

*Primary Examiner*—Richard R. Stearns
*Attorney, Agent, or Firm*—Neal J. Mosely

[57] ABSTRACT

A shaft alignment device comprises a pair of opposing adjustable clamping members, each being attached to the outside diameters of the shafts or axles to be aligned. A tubular, telescoping indicator holder extends outwardly from each clamping member. A dial indicator gauge is mounted on a rod projecting upwardly from the extended end of each indicator holder. The top surface of the clamping members are machined to a radius whereby rotating them 180° from each other forms an indicating circle which is read by the dial gauge mounted on the opposing indicator holder.

10 Claims, 4 Drawing Figures

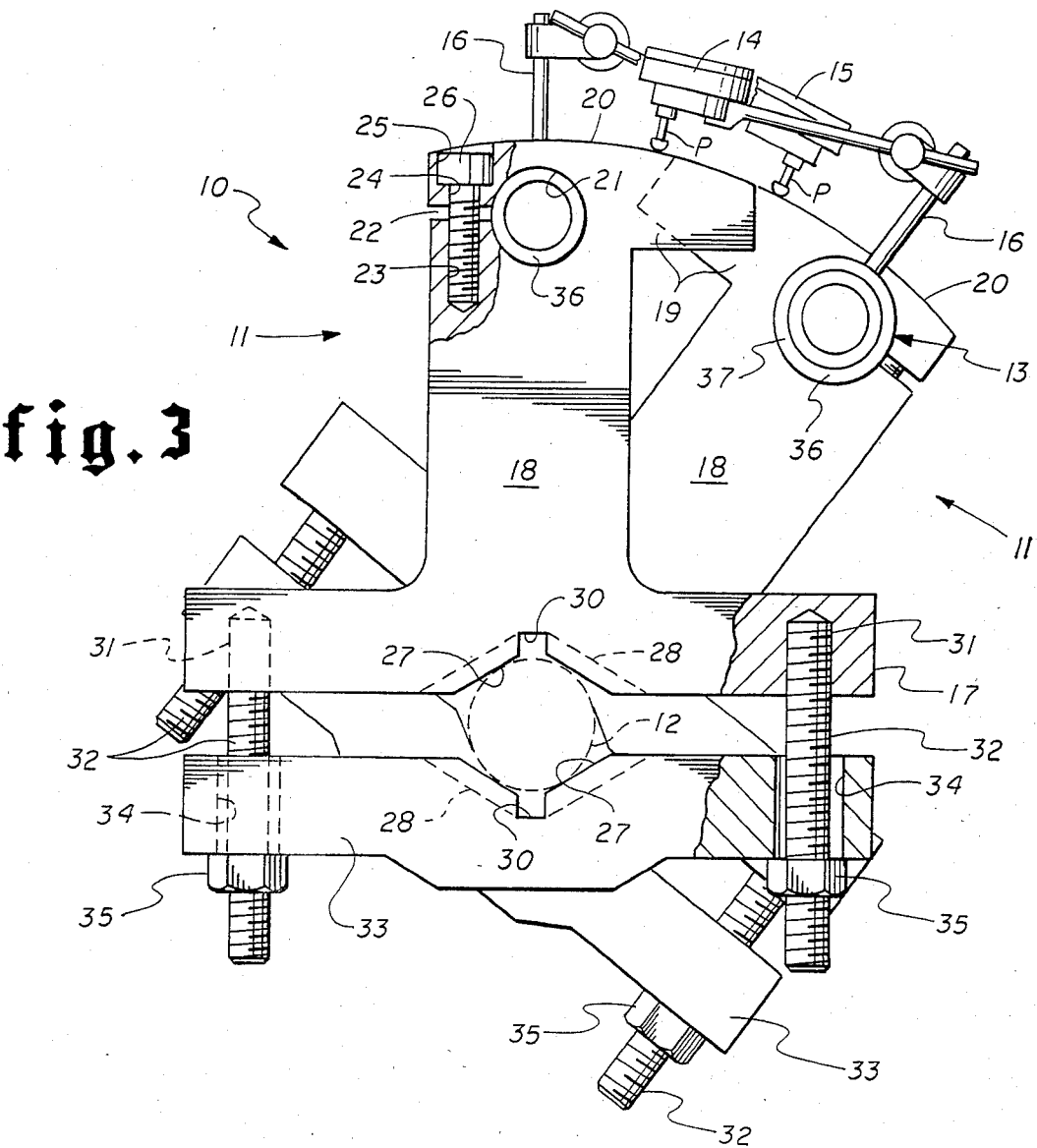

SHAFT ALIGNMENT DEVICE

BACKGROUND OF THE INVENTION

1. Field of the Invention

This invention relates to shaft alignment devices and more particularly to a shaft alignment device comprising two opposing clamping members providing a reading surface and each carrying adjustable gauge holders with dial indicator gauges mounted on the same circumferential plane.

2. Description of the Prior Art

When coupling two rotary shafts together, accurate vertical and horizontal alignment is required. Inaccurate alignment results in excessive and uneven bearing wear, sprung shafts, destructive vibration, and sometimes failure of the device driving the shaft. Devices to improve and simplify the alignment task are known in the art. There are several patents which illustrate the state of the art of alignment devices.

Glucoft, U.S. Pat. No. 3,664,029 discloses a dial indicator holder comprising a single head member on which one or a pair of dial indicators are carried. A belt or chain secures the head member to one shaft and one of the indicators may read periphery of a second shaft while the other indicator may read the squared end thereof.

Callahan, U.S. Pat. No. 2,638,676 discloses a shaft alignment device consisting of two matched rectangular members each slideably mounted on the shafts to be aligned. When brought into contact with each other, lateral or vertical misalignment is determined visually or with gauges. After correcting for misalignment, a final check is made by inserting alignment pins into holes provided in the two members.

McMaster, U.S. Pat. No. 4,161,068 discloses a two part tool for aligning shafts. One tool part has two surfaces at 90° from each other with each surface having a series of parallel lines and an instrument for measuring distances parallel to an axis of a shaft from both horizontal and vertical directions. The second tool part provides for extending two clear parallel lined members over the first tool part and exhibit a Moire fringe pattern if the shafts are not angularly aligned, and an extendable target for measuring displacement parallel to the shaft.

Guillet, U.S. Pat. No. 1,907,959 discloses a lining and leveling means for machinery wherein a wire is stretched across the frame of a machine and various leveling and lining operations are carried out by determining the changes in the tension of the wire.

Ricord, U.S. Pat. No. 2,639,513 discloses a means for optically aligning motion picture frames comprising a shuttle having a bore that encompasses a wire stretched between a light reflector and a carrier for the lens components. The accuracy of alignment of the components is indicated when the wire is observed to pass through the exact centers of the reflector and the carrier for the lens components.

The prior art in general, and none of these patents in particular, disclose the present invention which is simple to manufacture and especially easy to use.

SUMMARY OF THE INVENTION

It is therefore an object of the present invention to provide a shaft alignment device for use in accurately and quickly aligning rotary shafts.

Another object of this invention is to provide a shaft alignment device having two dial indicators on the same side for ease in taking readings.

Another object of this invention is to provide a shaft alignment device having dial indicators mounted on telescoping tubes for easy movement with minimum sag.

Other objects of the invention will become apparent from time to time throughout the specification and claims as hereinafter related.

The above noted objects and other objects of the invention are accomplished by a shaft alignment device comprising a pair of opposing adjustable clamping members attached to the outside diameters of the shafts or axles to be aligned. A tubular, telescoping indicator holder extends outwardly from each clamping member and a dial indicator gauge is mounted on a rod projecting upwardly from the extended end of each indicator holder. The top surface of the clamping members are machined to a radius whereby rotating them 180° from each other forms an indicating circle which is read by the dial gauge mounted on the opposing indicator holder.

BRIEF DESCRIPTION OF THE DRAWINGS

FIG. 3 is an elevational view of the right side of the shaft alignment device with portions shown in partial cross section.

FIG. 4 is an elevational view of one telescoping tube member of the shaft alignment device.

DESCRIPTION OF THE PREFERRED EMBODIMENT

Figure 1:
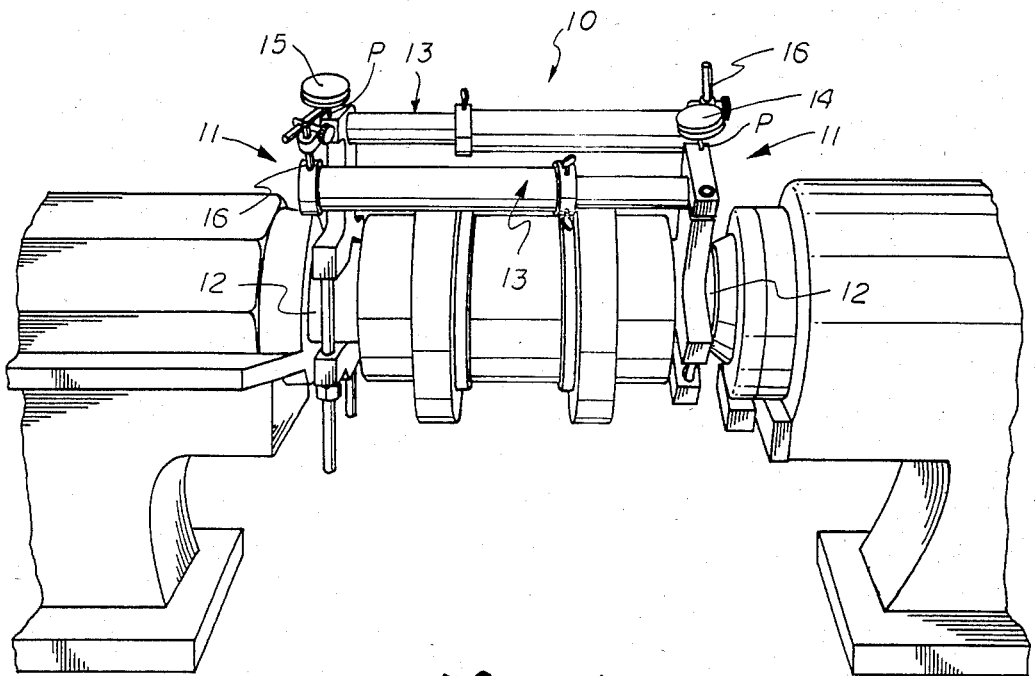
FIG. 1 is a perspective view of the shaft alignment device in position on a gear coupling.

Referring to the drawings by numerals of reference, and more particularly to FIG. 1, there is shown a shaft alignment device 10 which comprises a pair of identical opposing adjustable clamping members 11, each one being attached, in use, to the surface of the shafts 12 to be aligned. Identical tubular, telescoping indicator holders 13 extend outwardly from each clamping member 11. Dial indicator gauges 14 and 15 are mounted on rods 16 projecting upwardly from the extended end of each indicator holder 13.

Figure 2:
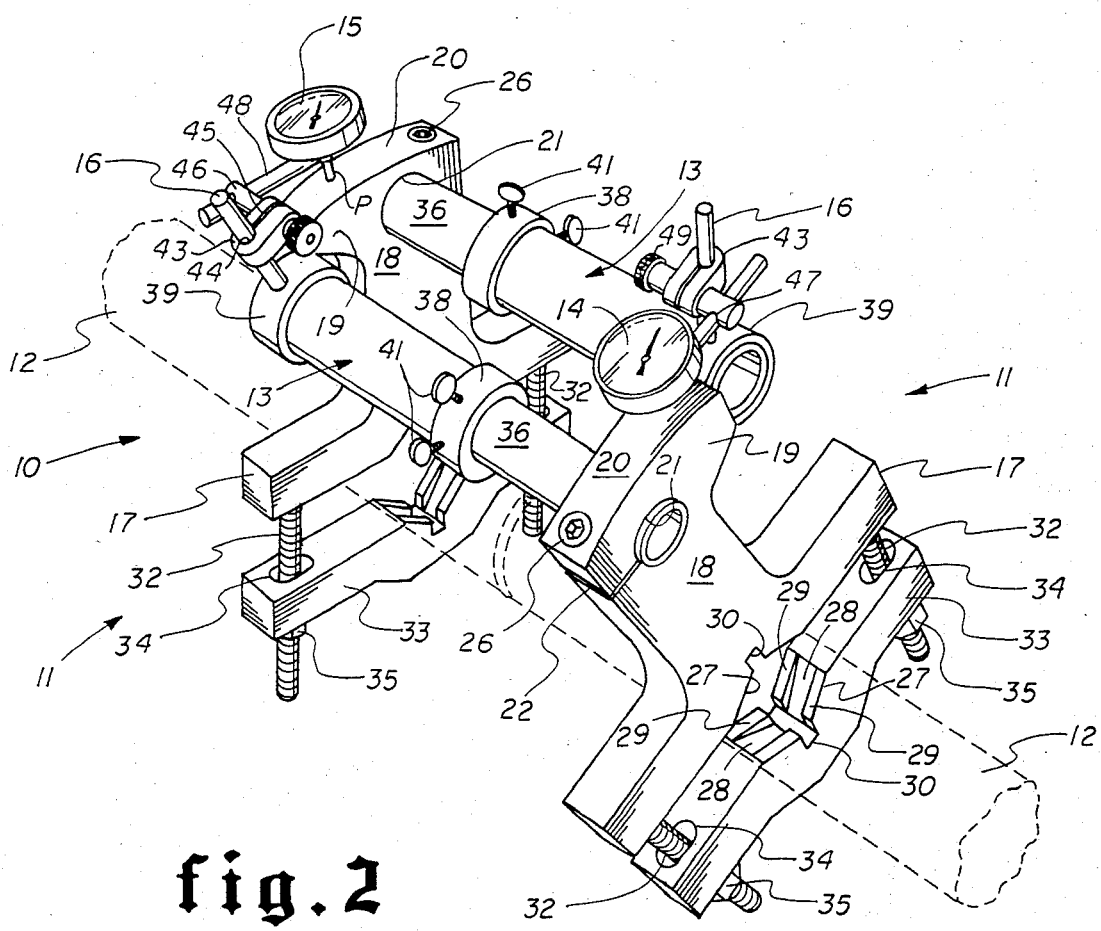
FIG. 2 is an isometric view of the shaft alignment device with two shafts shown in dotted line.

Referring now to FIGS. 2, 3, and 4, the shaft alignment device 10 will be described in detail. The clamping member 11 is generally T-shaped with a rectangular base or cross bar portion 17, a central extended stem or neck portion 18, and a top portion 19. Top portion 19 extends laterally to one side beyond the width of the stem or neck portion 18 and is machined on a radius whereby the top surface 20 of the clamping member forms an arc of a circle having its center concentric with the shaft on which it is mounted.

A hole 21 is drilled in the top portion 19 of the clamping member 11 with its center coplanar with the center of the base 17. A slot 22 extends laterally from the hole 21 to the outside of the neck or stem portion 18. A threaded hole 23 below and perpendicular to the slot 22 and a matching bore 24 and counterbore 25 above the slot 22 cooperatively receive an Allen head screw 26 to provide means for clamping the indicator holder 13 in place.

An inverted V-groove 27 is provided centrally in the base portion 17 of clamping member 11. Longitudinal slots 28 which are deeper than the V-groove 27 form raised portions 29 which are transversed by another slot 30 to provide four segments of the raised portion (FIGS. 2 and 3). Threaded holes 31 are located at each end on the bottom surface the base portion 17 to receive threaded studs 32.

A rectangular lower clamp member 33 is provided with an identical opposing V-groove 27 and slot arrangement as the base portion 17 and has holes 34 to receive studs 32. Nuts 35 allow the lower clamp member 33 and the base portion 17 of clamping member 11 to be securely clamped together and retained around shafts of various size with the V-slots contacting the outer surface of the shaft at eight points.

Indicator holder 13 comprises an inner tubular extension member 36 having an outside diameter sized to fit the hole 21 in the clamping member 11, and an outer tubular member 37 having an inside diameter sized for a slip fit over extension member 36 to telescope therewith. The ends of outer tubular member 37 are provided with raised collar portions 38 and 39, respectively. Collar 38 has two spaced, threaded holes 40 receiving thumbscrews 41 for securing the outer tubular member 37 adjustable on the inner extension member 36. Collar 39 has a threaded hole 42 receiving a rod 16. Rods 16 project outwardly from the indicator holders 13 for attaching conventional dial indicator gauges 14 and 15 thereon.

Each of the rods 16 has a U-shaped supporting bracket 43 having a bore 44 slidably fitted thereon and a slot 45 for securing and adjusting the same in place. A supporting rod 46 extends laterally through the ends of bracket 43 and has a hole 47 receiving supporting rod 48 for indicator gauge 14 or 15. A knurled adjusting knob 49 is threadedly secured on rod 46 and is operable to tighten bracket 43 to fix its position on rod 16 and the angular orientation of supporting rod 48. The indicator gauges are conventional gauges having feelers P which are movable in a direction normal to the plane of the gauge. A suitable gauge is a STARRETT gauge (product of L. S. Starrett Co., Athol, MA.) having a feeler and dial calibrated for measuring increments of 0.001 in., in the range from 0.000 to 0.100 in. The positioning of opposing clamping members and dial indicator gauges is clearly illustrated in FIG. 3.

OPERATION

The apparatus described above is used for shaft alignment of in-line rotary shafts, e.g. motor to generator, motor to pump, motor to gear box, etc., through a flexible coupling. One of the shafts may be in a fixed position and the other shaft adjustable. Of course both shafts can be adjustable but the adjustment would be made on only one of them.

The clamping members are secured in position on the shafts to be aligned as shown in FIGS. 1 and 2. One of the clamping members 11 is secured on the fixed shaft. The other clamping member 11 is secured on the movable or adjustable shaft. These clamping members fit a variety of shaft diameters. The clamping members 11 are secured on the shafts to be aligned with the telescoping supports 13 extending toward each other and offset so that gauge 15 is positioned over arcuate surface 20 on the support for gauge 14, and gauge 14 is positioned over arcuate surface 20 on the support for gauge 15.

The gauges 14 and 15 are positioned accurately linearly of the shafts by adjustment of the telescoping supports 13 which provide a rigid cantilevered support. Gauges 14 and 15 are properly positioned over the arcuate surfaces 20 with the feelers P contacting such surfaces and set to zero initially.

Horizontal offset is first adjusted by setting both indicators to zero with their respective feelers P touching the arcuate surfaces 20 of the opposing clamping member. The clamping members are then rotated together for 180° of movement. If the shafts are misaligned horizontally, this 180° movement will produce an offset reading on the gauges. Then position both indicator gauges to one-half their actual readings. Next, rotate the clamping members back 180° together and adjust the moveable shaft horizontally until both indicators read zero.

Vertical offset is then adjusted by positioning both indicator gauges to the top with the feelers P of the indicators on the arcuate surfaces 20 of the opposing clamping members. Dial in sag a a plus reading. To make both shafts parallel, rotate the indicator gauges 180° to the bottom and record indicator readings. Raise or lower the moveable shaft by the amount of the indicator reading until it reaches the proper height in relation to the fixed shaft. Then, readjust the horizontal positioning after the vertical adjustment is made.

This apparatus, when used as described, provides a quick and accurate alignment of rotary shafts with a small amount of labor and a low instrument cost.

While this invention has been described fully and completely with special emphasis upon a preferred embodiment, it should be understood that within the scope of the appended claims the invention may be practiced otherwise than is specifically described herein.

I claim:

1. A shaft alignment device for aligning a fixed shaft and a movable shaft for coupling comprising;
    a pair of substantially similar clamping members adapted to be secured one on each of said shafts,
    each of said clamping members comprising a solid body having an arcuate top surface adapted to be engaged by the gauge of the other clamping member when supported on said shafts with said gauges positioned closely adjacent to each other on the same side of said shafts,
    a pair of elongated gauge-supporting members supported one in each of said clamping members and extending normal thereto,
    one of said gauge-supporting members extending outward from one side of one of said clamping members, and the other gauge-supporting member extending outward from the other side of the other clamping member whereby said gauge-supporting members may be positioned extending toward each other in overlapping relation when said clamping members are positioned on said shafts for alignment thereof,
    a gauge holding rod extending laterally from and carried by the end of each of said gauge-supporting members, and
    a pair of dial indicator gauges mounted one on each of said rods, each having a feeler adapted to be positioned to contact the arcuate surface of the opposing clamping member adjacent to said gauge-supporting members whereby readings are taken from the surface thereof in different angular orientations of said apparatus on said shafts to determine the amount of misalignment and make adjustments in said alignment, and said arcuate surfaces being machined on a radius whereby rotation of said members, when supported on said shafts, defines an indicating circle from the surface of which readings are taken by the dial gauge mounted on the opposing gauge holding rod.

2. A shaft alignment device for aligning a fixed shaft and a movable shaft for coupling comprising;
   a pair of substantially similar clamping members adapted to be secured one on each of said shafts, said clamping members each comprising;
   a rectangular base portion having a centrally located inverted V-slot in its bottom surface, a generally rectangular extended neck portion extending upwardly therefrom, a top portion extending laterally to one side beyond the width of said neck portion and machined on a radius to define a top surface forming an arc of a cirlce having its center concentric with the shaft on which said clamping member is mounted,
   said top portion having a transversely extending hole, with a center line coplanar with the center of said base member, receiving and supporting gauge-supporting members,
   a rectangular lower clamp member having a matching V-groove to said V-groove in the base portion,
   means to clamp said lower clamp member and said base portion securely around shafts of various size with said V-slots contacting the outer surface of said shafts,
   a pair of elongated gauge-supporting members supported one in each of said clamping members and extending normal thereto,
   one of said gauge-supporting members extending outward from one side of one of said clamping members, and the other gauge-supporting member extending outward from the other side of the other clamping member whereby said gauge-supporting members may be positioned extending toward each other in overlapping relation when said clamping members are positioned on said shafts for alignment thereof,
   a gauge holding rod extending laterally from and carried by the end of each of said gauge-supporting members, and
   a pair of dial indicator gauges mounted one on each of said rods, each having a feeler adapted to be positioned to contact the surface of the opposing clamping member whereby readings are taken from the surface thereof in different angular orientations of said apparatus on said shafts to determine the amount of misalignment and make adjustments in said alignment.

3. A shaft alignment device according to claim 2 wherein
   said rectangular base portion is provided with downwardly extending threaded studs,
   said rectangular lower clamp member is provided with holes to slidably receive said studs extending from said base portion, and
   having nuts threadably received on said studs for securely clamping said lower clamp member and said base portion around shafts of various size with said V-slots contacting the outer surface of the shaft.

4. A shaft alignment device according to claim 2 wherein
   said gauge-supporting members comprise a first tubular extension member secured in said hole in said clamping member and a second tubular member slideably mounted thereon in telescoping engagement therewith,
   said second tubular member including a first means for securing the same to said first tubular member and means for adjustably supporting a gauge on said gauge-holding rod.

5. A shaft alignment device according to claim 2 wherein
   said rectangular base portion is provided with downwardly extending threaded studs,
   rotation of said members, when supported on said shafts, defining an indicating circle from the surface of which readings are taken by the dial gauge mounted on the opposing gauge holding rod,
   said rectangular lower clamp member being provided with holes to slidably receive said studs extending from said base portion, and
   having nuts threadably received on said studs for securely clamping said lower clamp member and said base portion around shafts of various size with said V-slots contacting the outer surface of the shaft.

6. A shaft alignment device according to claim 5 wherein
   said gauge-supporting members comprise a first tubular extension member secured in said hole in said clamping member and a second tubular member slideably mounted thereon in telescoping engagement therewith,
   said second tubular member including a first means for securing the same to said first tubular member and means for adjustably supporting a gauge on said gauge-holding rod, and
   said gauge holding rod having an adjustable bracket supporting said indicator gauge for adjustable extension and adjustable angular positioning for positioning said gauge with the feeler thereof contacting the arcuate surface of the opposing clamping member.

7. A method of aligning a fixed shaft and a movable shaft for coupling comprising;
   securing a pair of substantially similar clamping members one on each of said shafts, with an elongated gauge-supporting member supported in each of said clamping members extending normal thereto toward each other in overlapping relation, a gauge holding rod extending laterally from and carried by the end of each of said gauge-supporting members, and a pair of dial indicator gauges mounted one on each of said rods, each having a feeler,
   positioning each of said indicator gauges with the feelers of each contacting the surface of the opposing clamping member,
   making a horizontal adjustment of said shafts by zeroing said indicator gauges,
   rotating said clamping members together a distance of 180°, and reading said indicator gauges,
   resetting said indicator gauges to one-half said reading,
   rotating said clamping members together a further 180°,
   adjusting said movable shaft horizontally until both indicator gauges read zero,
   making a vertical adjustment of said shafts by
   positioning said clamping members with both indicator gauges on top, resetting said indicator gauges to set the sag as a plus reading, rotating said clamping members together 180° to the bottom, reading said indicator gauges in said bottom position, adjusting the vertical position of said movable shaft by the amount of said gauge readings to align said shafts vertically, and repeating the horizontal adjustment by the steps previously defined.

8. A method according to claim 7 wherein said clamping members having arcuate top surfaces machined on a radius whereby rotation of said members, when supported on said shafts, defining an indicating circle, and positioning said indicator gauges with the feelers thereof against said indicating circle surface to take said readings for making said horizontal and vertical shaft adjustments.

9. A method according to claim 8 wherein said gauge-supporting members comprising a first tubular extension member secured in said clamping member and a second tubular member slideably mounted thereon in telescoping engagement therewith, said second tubular member including means for securing the same to said first tubular member and means for adjustably supporting a gauge on said gauge-holding rod, and positioning said clamping members with their respective tubular members in overlapping relation supporting said indicator gauges with their respective feeler members contacting the arcuate surface of the opposing clamping member.

10. A method according to claim 9 wherein said gauge holding rods each having an adjustable bracket supporting said indicator gauge for adjustable extension and adjustable angular positioning, and positioning each of said gauges by selected extension and angular position with the feelers of each contacting the arcuate surface of the opposing clamping member.

* * * * *